US011479248B2

(12) United States Patent
Ito et al.

(10) Patent No.: US 11,479,248 B2
(45) Date of Patent: Oct. 25, 2022

(54) VEHICLE CONTROL APPARATUS

(71) Applicant: Toyota Jidosha Kabushiki Kaisha, Toyota (JP)

(72) Inventors: Shogo Ito, Shizuoka-ken (JP); Masahiko Adachi, Susono (JP); Kohei Tochigi, Susono (JP); Yuta Ikezawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 16/720,861

(22) Filed: Dec. 19, 2019

(65) Prior Publication Data

US 2020/0207347 A1 Jul. 2, 2020

(30) Foreign Application Priority Data

Dec. 27, 2018 (JP) .............................. JP2018-244076

(51) Int. Cl.
*B60W 30/16* (2020.01)
*B60W 50/00* (2006.01)
*G08G 1/16* (2006.01)

(52) U.S. Cl.
CPC .......... *B60W 30/162* (2013.01); *B60W 50/00* (2013.01); *G08G 1/166* (2013.01); *B60W 2050/0088* (2013.01); *B60W 2554/801* (2020.02); *B60W 2555/60* (2020.02); *B60W 2556/00* (2020.02); *B60W 2720/106* (2013.01); *B60W 2754/30* (2020.02)

(58) Field of Classification Search
CPC ............... B60W 30/162; B60W 50/00; B60W 2556/00; B60W 2555/60; B60W 2754/30; B60W 2554/801; B60W 2050/0088; B60W 2720/106; G08G 1/166
See application file for complete search history.

(56) References Cited

U.S. PATENT DOCUMENTS

| 4,653,816 A * | 3/1987 | Lin | ........................... B60T 8/58 |
| | | | 303/175 |
| 6,405,116 B1 * | 6/2002 | Koibuchi | .................. B60T 7/12 |
| | | | 701/70 |

(Continued)

FOREIGN PATENT DOCUMENTS

| JP | H05270369 A | 10/1993 |
| JP | H05310110 A | 11/1993 |

(Continued)

*Primary Examiner* — Jelani A Smith
*Assistant Examiner* — Frank T Glenn, III
(74) *Attorney, Agent, or Firm* — Dinsmore & Shohl LLP

(57) ABSTRACT

A vehicle control apparatus is provided with: a recognizer configured to recognize a surrounding situation of a host vehicle; a controller programmed to perform a deceleration control when a deceleration target is recognized by the recognizer; and a detector configured to detect a slip of the host vehicle. The controller sets a first controlled variable, which is a controlled variable associated with the deceleration control when the slip of the host vehicle is detected without execution of the deceleration control, so as to suppress an extent of deceleration of the host vehicle, in comparison with a second controlled variable, which is the controlled variable when the slip of the host vehicle is not detected without execution of the deceleration control.

8 Claims, 2 Drawing Sheets

(56) References Cited

U.S. PATENT DOCUMENTS

| | | | |
|---|---|---|---|
| 6,459,982 B1* | 10/2002 | Kobayashi | B60K 31/0008 340/436 |
| 2007/0225882 A1* | 9/2007 | Yamaguchi | B60W 50/14 701/45 |
| 2009/0018740 A1* | 1/2009 | Noda | B60T 7/22 701/70 |
| 2010/0023226 A1* | 1/2010 | Ito | B60R 21/0134 701/46 |
| 2013/0245945 A1* | 9/2013 | Morita | G08G 1/09675 701/533 |
| 2014/0222244 A1* | 8/2014 | Ogawa | G08G 1/096725 701/1 |
| 2015/0239442 A1* | 8/2015 | Yamakado | B60W 10/08 701/70 |
| 2018/0072290 A1* | 3/2018 | Boethel | B60T 8/1708 |
| 2018/0265092 A1 | 9/2018 | Yoneda et al. | |

FOREIGN PATENT DOCUMENTS

| | | |
|---|---|---|
| JP | 2007-285243 A | 11/2007 |
| JP | 2009-018721 A | 1/2009 |
| JP | 2018-154242 A | 10/2018 |
| WO | 2012/114382 A1 | 8/2012 |

* cited by examiner

VEHICLE CONTROL APPARATUS

CROSS-REFERENCE TO RELATED APPLICATIONS

This application is based upon and claims the benefit of priority of the prior Japanese Patent Application No. 2018-244076, filed on Dec. 27, 2018, the entire contents of which are incorporated herein by reference.

BACKGROUND

1. Technical Field

Embodiments of the present disclosure relate to a vehicle control apparatus.

2. Description of the Related Art

This type of apparatus is provided to prevent a vehicle from slipping. For example, Japanese Patent Application Laid Open No. 2007-285243 (Patent Literature 1) discloses an apparatus configured to intentionally cause rear tires to slip immediately before a vehicle stops, thereby obtaining a driving force transmission tolerance corresponding to a road surface friction coefficient of a place where the vehicle stops, and configured to define an upper limit of a driving force to be generated on the rear tires on the basis of the obtained driving force transmission tolerance, so as to prevent slipping when the vehicle starts.

In the technology/technique disclosed in the Patent Literature 1, it is necessary to intentionally cause the rear tires to slip, and the costs of the apparatus may be high.

SUMMARY

In view of the aforementioned problem, it is therefore an object of embodiments of the present disclosure to provide a vehicle control apparatus that can prevent a vehicle from slipping in a configuration having reduced costs.

The above object of embodiments of the present disclosure can be achieved by a vehicle control apparatus provided with: a recognizer configured to recognize a surrounding situation of a host vehicle; a controller programmed to perform a deceleration control of assisting the host vehicle in decelerating, when a deceleration target is recognized by the recognizer, wherein the deceleration target is ahead of the host vehicle on a course thereof and requires the host vehicle to decelerate or stop; and a detector configured to detect a slip of the host vehicle, wherein the controller is programmed to set a first controlled variable, which is a controlled variable associated with the deceleration control when the slip of the host vehicle is detected without execution of the deceleration control, so as to suppress an extent of deceleration of the host vehicle, in comparison with a second controlled variable, which is the controlled variable when the slip of the host vehicle is not detected without execution of the deceleration control.

DETAILED DESCRIPTION OF THE EMBODIMENT

A vehicle control apparatus according to an embodiment of the present disclosure will be explained with reference to FIG. 1 to FIG. 3.

Configuration

A configuration of the vehicle control apparatus according to the embodiment will be explained with reference to FIG. 1. FIG. 1 is a block diagram illustrating a configuration of the vehicle control apparatus according to the embodiment.

Figure 1:
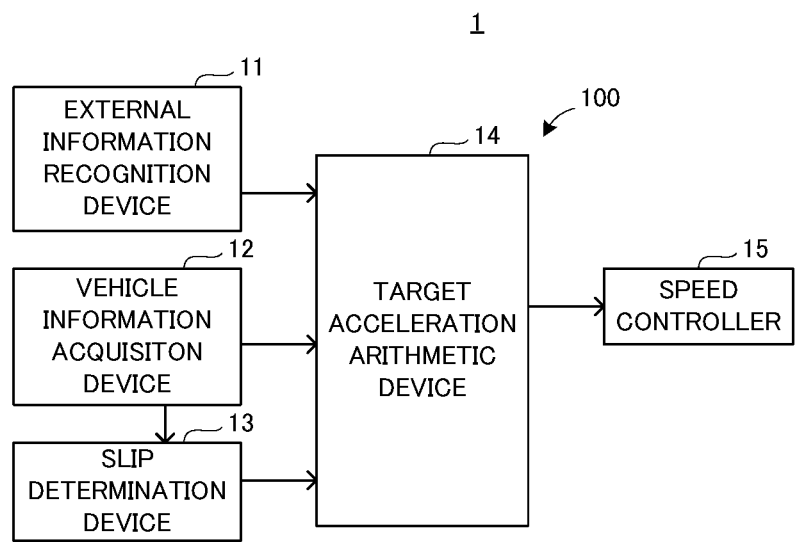
FIG. 1 is a block diagram illustrating a configuration of a vehicle control apparatus according to an embodiment.

In FIG. 1, a vehicle control apparatus 100 is mounted on a vehicle 1. The vehicle control apparatus 100 is configured to perform a deceleration control of assisting the vehicle 1 in decelerating. The deceleration control may be performed when the following three conditions are satisfied; namely, (i) a deceleration target associated with the deceleration control is recognized; (ii) a distance between the vehicle 1 and the recognized deceleration target is less than or equal to a predetermined distance, and (iii) a driver does not step on any of an accelerator pedal and a brake pedal. The conditions for performing the deceleration control may not be limited to those conditions, and may be set as occasion demands.

Here, the "deceleration target" may be something that requires the vehicle 1 to decelerate or stop. Specifically, examples of the deceleration target are: an obstacle, such as, for example, another vehicle, a pedestrian, and a structure; something that restricts travel of the vehicle 1, such as, for example, a road sign, a red light, and a stop line; and a road structure, such as, for example, an intersection and a curve.

The vehicle control apparatus 100 is provided with an external information recognition device 11, a vehicle information acquisition device 12; a slip determination device 13, a target acceleration arithmetic device 14, and a speed controller 15, so as to realize the deceleration control.

The external information recognition device 11 is configured to recognize a surrounding situation of the vehicle 1, on the basis of an output of a detector configured to detect an external situation of the vehicle 1, such as, for example, a millimeter wave radar, a camera, and light detection and ranging (LiDAR). The external information recognition device 11 is further configured to generate external information indicating the recognized surrounding situation. A detailed explanation of a method of recognizing the surrounding situation of the vehicle 1 will be omitted because various existing aspects can be applied thereto.

The vehicle information acquisition device 12 is configured to obtain vehicle information indicating a state of the vehicle 1, from an output of a detector configured to detect the state of the vehicle 1, such as, for example, a vehicle wheel speed sensor, an accelerator pedal sensor, a brake pedal sensor, and a steering angle sensor. A detailed explanation of a method of obtaining the vehicle information will be omitted because various existing aspects can be applied thereto.

The slip determination device 13 is configured to determine whether or not the vehicle 1 has slipped. If it is determined that the vehicle 1 has slipped, the slip determination device 13 is configured to transmit a signal indicating the determination result to the target acceleration arithmetic device 14. Here, whether or not the vehicle 1 has slipped may be determined, for example, on the basis of a result of a comparison between a speed of the vehicle 1 (i.e., a vehicle body speed) and a vehicle wheel speed. A method of determining a slip may not be limited to this example, and various existing aspects can be applied to the method.

The target acceleration arithmetic device 14 is configured to determine whether or not the deceleration control is to be performed, on the basis of the external information generated by the external information recognition device 11 and the vehicle information obtained by the vehicle information acquisition device 12. If it is determined that the deceleration control is to be performed, the target acceleration arithmetic device 14 is configured to arithmetically operate target acceleration (which is herein target acceleration with a negative value, i.e., target deceleration). The target acceleration arithmetic device 14 is particularly configured to arithmetically operate the target acceleration on the basis of an output of the slip determination device 13 so as to suppress an extent of deceleration of the vehicle 1 if the slip of the vehicle 1 is detected without execution of the deceleration control (or when the deceleration control is not performed) (i.e., if it is determined by the slip determination device 13 that the vehicle 1 has slipped), in comparison with those when the slip of the vehicle 1 is not detected without execution of the deceleration control. A specific arithmetic method will be described later.

The speed controller 15 is programmed or configured to control, for example, a throttle actuator, a brake actuator, or the like, so as to realize the target acceleration arithmetically operated by the target acceleration arithmetic device 14. A detailed explanation of a method of controlling the speed of the vehicle 1 will be omitted because various existing aspects can be applied thereto.

Operation

Operations of the vehicle control apparatus 100 will be explained with reference to FIG. 2 and FIG. 3. Here, with reference to FIG. 2, a concept of the operations of the vehicle control apparatus 100 will be firstly explained.

If a road surface friction coefficient is relatively low, for example, due to icy road conditions or the like, the vehicle 1 possibly slips. If the vehicle 1 slips during execution of the deceleration control, it may be hard to appropriately control the behavior of the vehicle 1. For example, known technology may detect vehicle slip during current execution of the deceleration control and reflect it in subsequent execution of the deceleration control. However, the vehicle also possibly slips due to the deceleration control, and the vehicle may also slip even in the subsequent execution of the deceleration control. For example, known technology may intentionally cause the vehicle to slip so as to estimate the road surface friction coefficient and reflecting it in the deceleration control. However, it is necessary to provide a configuration for unintentionally causing the vehicle to slip, and it is relatively expensive in costs.

Figure 2:
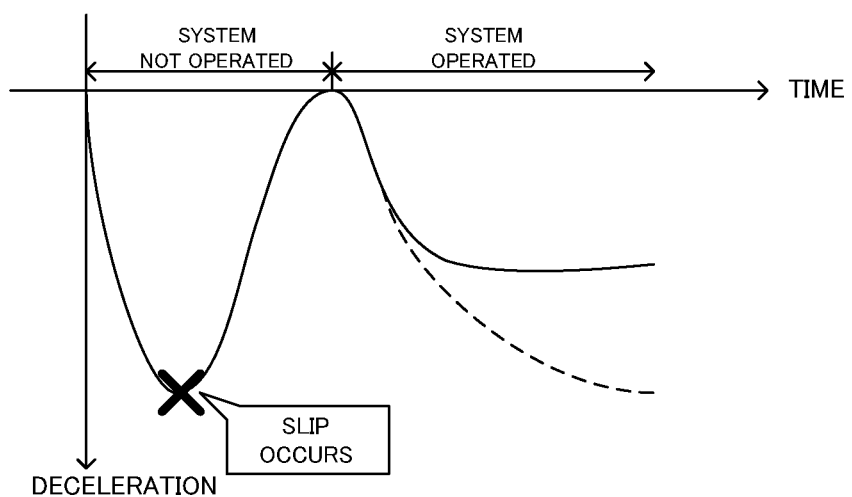
FIG. 2 is a diagram illustrating a concept of operations of the vehicle control apparatus according to the embodiment.

Thus, on the vehicle control apparatus 100, the target acceleration associated with the deceleration control may be changed depending on whether or not the slip of the vehicle 1 is detected without execution of the deceleration control (refer to "SYSTEM NOT OPERATED" in FIG. 2). Examples of the expression "without execution of the deceleration control (or when the deceleration control is not performed)" are, for example, when the vehicle 1 is decelerated by the driver of the vehicle 1 stepping on the brake pedal, and when the vehicle is naturally decelerated without the driver of the vehicle 1 stepping on the accelerator pedal and the brake pedal. FIG. 2 illustrates that the slip of the vehicle 1 is detected during deceleration of the vehicle 1; however, as long as the deceleration control is not performed, the slip of the vehicle 1 may be detected not only during deceleration of the vehicle 1 but also during acceleration of the vehicle 1.

By virtue of such a configuration, if the slip of the vehicle 1 is detected on the vehicle control apparatus 100, it is possible to conclude that the vehicle 1 has slipped, not due to the deceleration control, but due to a road surface condition (i.e., the road surface friction coefficient). In addition, it is also possible to reduce costs because it is not necessary to intentionally cause the vehicle 1 to slip.

If the slip of the vehicle 1 is not detected without execution of the deceleration control, the target acceleration arithmetic device 14 of the vehicle control apparatus 100 may arithmetically operate the target acceleration so that relatively large deceleration is generated in the vehicle 1 during execution of the deceleration control (refer to "SYSTEM OPERATED" in FIG. 2), as indicated in a dashed line in FIG. 2. On the other hand, if the slip of the vehicle 1 is detected without execution of the deceleration control, the target acceleration arithmetic device 14 may arithmetically operate the target acceleration so as to suppress the deceleration generated in the vehicle 1 during execution of the deceleration control, in comparison with those when the slip of the vehicle 1 is not detected without execution of the deceleration control, as indicated in a solid line in FIG. 2. In this case, the vehicle 1 is in a situation in which effects expected for the deceleration control (e.g., an effect that the vehicle 1 stops at a target stop position, etc.) may be lost.

Figure 3:
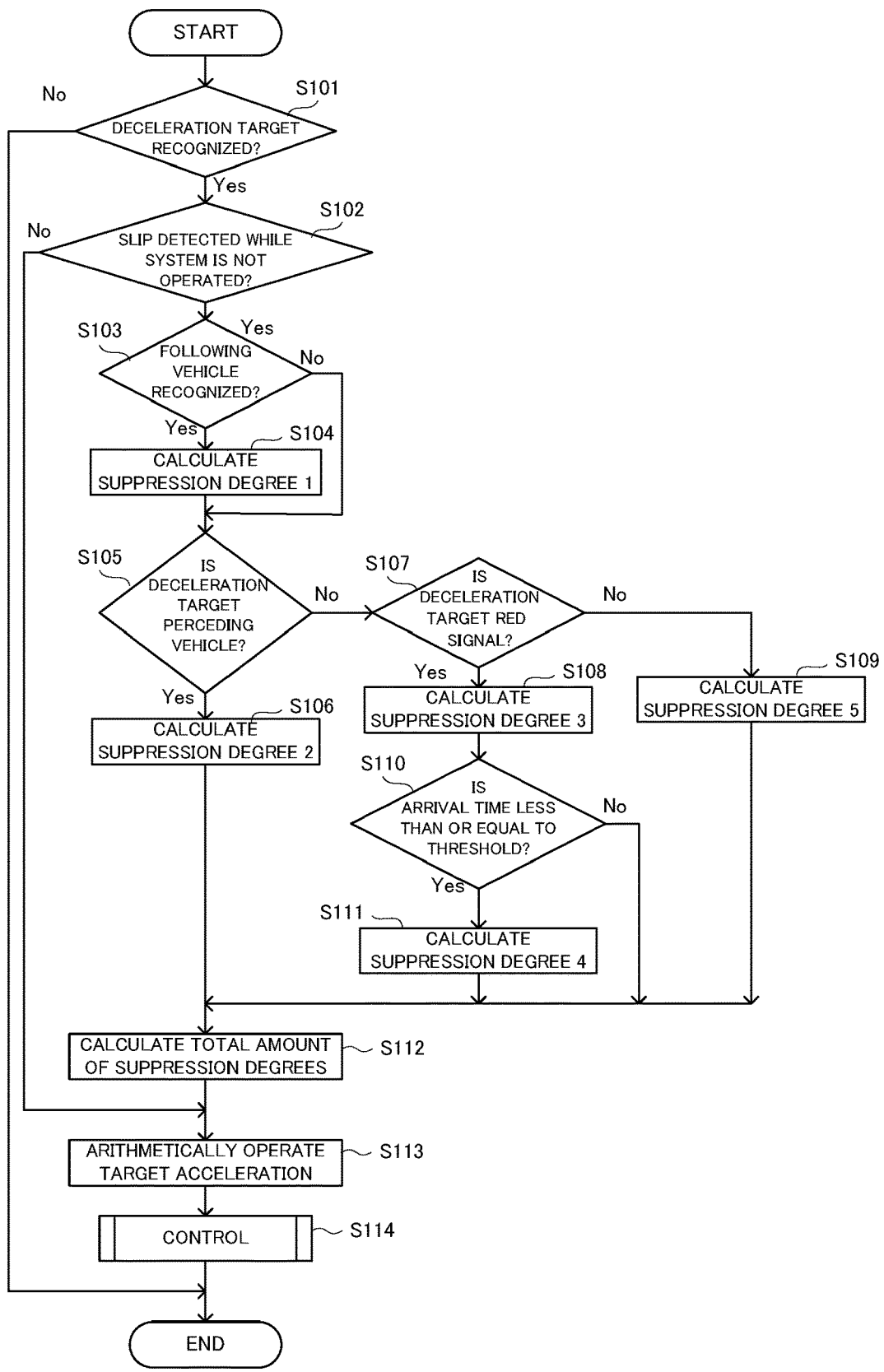
FIG. 3 is a flowchart illustrating the operations of the vehicle control apparatus according to the embodiment.

Next, with reference to a flowchart in FIG. 3, the operations of the vehicle control apparatus 100 will be specifically explained.

In FIG. 3, the target acceleration arithmetic device 14 determines whether or not the deceleration target is recognized, on the basis of the external information generated by the external information recognition device 11 (step S101). In the step S101, if it is determined that the deceleration target is not recognized (the step S101: No), the operations illustrated in FIG. 3 are ended. Then, after a lapse of a predetermined period (e.g., several ten milliseconds to several hundred milliseconds), the step S101 is performed. In other words, the operations illustrated in FIG. 3 are repeated with a period corresponding to the predetermined time.

In the step S101, if it is determined that the deceleration target is recognized (the step S101: Yes), the target acceleration arithmetic device 14 determines whether or not the slip of the vehicle 1 is detected without execution of the deceleration control (i.e., while a system is not operated), on the basis of the output of the slip determination device 13 (step S102). In the step S102, if it is determined that the slip of the vehicle 1 is not detected without execution of the deceleration control (the step S102: No), a step S113 described later is performed.

In the step S102, if it is determined that the slip of the vehicle 1 is detected without execution of the deceleration control (the step S102: Yes), the target acceleration arithmetic device 14 determines whether or not a following vehicle is recognized, on the basis of the external information (step S103). In the step S103, if it is determined that a following vehicle is not recognized (the step S103: No), a step S105 described later is performed.

In the step S103, if it is determined that a following vehicle is recognized (the step S103: Yes), the target acceleration arithmetic device 14 calculates a suppression degree 1, which is one of indexes indicating an extent of suppression of the target acceleration associated with the deceleration control (step S104).

The target acceleration arithmetic device 14 then determines whether or not the deceleration target is a preceding vehicle (step S105). The "preceding vehicle" is an example of the deceleration target that possibly collides with the vehicle 1, but limitation is not made by this. In the step S105, if it is determined that the deceleration target is a preceding vehicle (the step S105: Yes), the target acceleration arithmetic device 14 calculates a suppression degree 2, which is another one of the indexes indicating the extent of suppression of the target acceleration associated with the deceleration control (step S106).

In the step S105, if it is determined that the deceleration target is not a preceding vehicle (the step S105: No), the target acceleration arithmetic device 14 determines whether or not the deceleration target is a red light (i.e., a traffic light in red signal color) (step S107). In the step S107, if it is determined that the deceleration target is not a red light (the step S107: No), the target acceleration arithmetic device 14 calculates a suppression degree 5, which is another one of the indexes indicating the extent of suppression of the target acceleration associated with the deceleration control (step S109). At this time, the target acceleration arithmetic device 14 may change a method of calculating the suppression degree 5, depending on whether the deceleration target is something that does not collide with the vehicle 1 and that requires the vehicle 1 to stop (e.g., a stop sign, etc.), or something that does not collide with the vehicle 1 and that requires the vehicle 1 to decelerate (e.g., an intersection, etc.).

In the step S107, if it is determined that the deceleration target is a red light (the step S107: Yes), the target acceleration arithmetic device 14 calculates a suppression degree 3, which is another one of the indexes indicating the extent of suppression of the target acceleration associated with the deceleration control (step S108).

The target acceleration arithmetic device 14 then determines whether or not an arrival time is less than or equal to a threshold value (step S110), wherein the arrival time is obtained on the basis of a distance between the vehicle 1 and the red light, which is the deceleration target, when the color of the traffic light turns red (e.g., when the red light is firstly recognized by the external information recognition device 11) and on the basis of the speed of the vehicle 1, and wherein the arrival time is namely a time required for the vehicle 1 to move to a position of the red light from a position of the vehicle 1 when the color of the traffic light turns red.

In the step S110, if it is determined that the arrival time is greater than the threshold value (the step S110: No), a step S112 described later is performed. In the step S110, if it is determined that the arrival time is less than or equal to the threshold value (the step S110: Yes), the target acceleration arithmetic device 14 calculates a suppression degree 4, which is another one of the indexes indicating the extent of suppression of the target acceleration associated with the deceleration control (step S111).

Here, the "threshold value" may be a value for determining whether or not the suppression degree 4 is to be calculated, and may be set in advance as a fixed value or a variable value corresponding to some physical quantity or parameters. The threshold value may be set as follows: for example, obtaining a relation between the arrival time and the possibility of the slip of the vehicle 1 when the vehicle 1 is decelerated to stop due to the red light, by experiments, experiences, or simulations; and setting the threshold value as an arrival time in which the possibility of the slip of the vehicle 1 has an upper limit of an allowable range on the basis of the obtained relation.

After the step S106, S109, or S111, the target acceleration arithmetic device 14 calculates a total amount of the suppression degrees (step S112). For example, when a following vehicle is recognized and the deceleration target is a preceding vehicle, the sum of the suppression degree 1 and the suppression degree 2 is calculated as the total amount of the suppression degrees.

Here, each of the suppression degrees 1 to 5 may be calculated so as to suppress the extent of deceleration of the vehicle 1 caused by the deceleration control performed after the detection of the slip of the vehicle 1 without execution of the deceleration control, in comparison with those caused by the deceleration control performed without the detection of the slip of the vehicle 1 without execution of the deceleration control. Specifically, for example, each of the suppression degrees 1 to 5 may be calculated on the basis of the deceleration when the slip of the vehicle 1 is detected without execution of the deceleration control. The suppression degree 2 is calculated as a value that allows the target acceleration to be suppressed more than the suppression degree 3 and the suppression degree 5. For example, if a higher suppression degree allows the target acceleration to be more suppressed, the suppression degree 2 is a greater value than those of the suppression degree 3 and the suppression degree 5. Moreover, the suppression degree 3 is typically calculated as a value that allows the target acceleration to be suppressed more than that of the suppression degree 5.

In the case of "No" in the step S102, or after the step S112, the target acceleration arithmetic device 14 arithmetically operates the target acceleration (step S113). If the target acceleration is arithmetically operated after the step S112, the target acceleration arithmetic device 14 arithmetically operates the target acceleration in view of the total amount of the suppression degrees calculated in the step S112.

Examples of a method of arithmetically operating the target acceleration in view of the total amount of the suppression degrees are, for example, (i) a method in which a limit value of the target acceleration (which is herein negative target acceleration, i.e., deceleration) is set on the basis of the total amount of the suppression degrees and in which the target acceleration is arithmetically operated not to exceed the set limit value (so-called upper limit guard), (ii) a method in which a gain of 1 or less is set on the basis of the total amount of the suppression degrees and in which final target acceleration is arithmetically operated by multiplying the arithmetically operated target acceleration by the set gain, (iii) a method in which a gain of 1 or less, which is to be used for multiplication of a coefficient (e.g., jerk, etc.) for defining a slope of the acceleration, is set on the basis of the total amount of the suppression degrees and in which the target acceleration is arithmetically operated not to exceed a value obtained by multiplying the coefficient for defining the slope by the set gain, and the like. The target acceleration that takes into account the total amount of the suppression degrees may be zero. In other words, the vehicle 1 may not be decelerated by the deceleration control.

When a following vehicle is recognized, the suppression degree 1 is calculated, whereas when the following vehicle is not recognized, the suppression degree 1 is not calculated. In other words, when a following vehicle is recognized, the target acceleration is suppressed more than those when the following vehicle is not recognized.

The suppression degree 2 obtained when the deceleration target is a preceding vehicle (i.e., something that possibly collides with the vehicle 1) is a value that suppresses the target value more than the suppression degree 3 (or moreover, the suppression degree 5) obtained when the deceleration target is a red light (i.e., something that does not collide with the vehicle 1). In other words, if the deceleration target is something that does not collide with the vehicle 1 (to put it differently, if a collision risk is relatively low), the target acceleration is suppressed more than those when the deceleration target is something that possibly collides with the vehicle 1 (to put it differently, when the collision risk is relatively high).

When the arrival time is less than or equal to the threshold value, the suppression degree 4 is calculated, whereas when the arrival time is greater than the threshold value, the suppression degree 4 is not calculated. In other words, when the arrival time is less than or equal to the threshold value (to put it differently, the distance from the vehicle 1 when the color of the traffic light turns red, to the red light, which is the deceleration target, is relatively short), the target acceleration is suppressed more than those when the arrival time is greater than the threshold value (to put it differently, the distance from the vehicle 1 when the color of the traffic light turns red, to the red light, which is the deceleration target, is relatively long).

After the step S113, the target acceleration arithmetic device 14 determines that the deceleration control is to be performed if the conditions for performing the deceleration control (e.g., (i) the deceleration target associated with the deceleration control is recognized; (ii) the distance between the vehicle 1 and the recognized deceleration target is less than or equal to the predetermined distance, and (iii) the driver does not step on any of the accelerator pedal and the brake pedal) are satisfied, on the basis of the external information generated by the external information recognition device 11 and the vehicle information obtained by the vehicle information acquisition device 12. The target acceleration arithmetic device 14 then transmits a signal indicating the target acceleration arithmetically operated in the step S113, to the speed controller 15. As a result, the deceleration control is actually performed (step S114).

Technical Effect

Note that on the vehicle control apparatus 100, the process from the step S101 to the step S113 is performed before the deceleration control is actually performed. In other words, on the vehicle control apparatus 100, if the slip of the vehicle 1 is detected without execution of the deceleration control, the target acceleration that takes into account the total amount of the suppression degrees is arithmetically operated before the deceleration control is actually performed. Thus, according to the vehicle control apparatus 100, even if the road surface condition easily causes the vehicle 1 to slip, it is possible to prevent the behavior of the vehicle 1 from becoming unstable due to the deceleration control. In addition, the vehicle control apparatus 100 does not require a special configuration for detecting the slip of the vehicle 1, so that it is possible to reduce costs.

Various aspects of embodiments of the present disclosure derived from the embodiment explained above will be explained hereinafter.

A vehicle control apparatus according to an aspect of embodiments of the present disclosure is a vehicle control apparatus provided with: a recognizer configured to recognize a surrounding situation of a host vehicle; a controller programmed to perform a deceleration control of assisting the host vehicle in decelerating, when a deceleration target is recognized by the recognizer, wherein the deceleration target is ahead of the host vehicle on a course thereof and requires the host vehicle to decelerate or stop; and a detector configured to detect a slip of the host vehicle, wherein the controller is programmed to set a first controlled variable, which is a controlled variable associated with the deceleration control when the slip of the host vehicle is detected without execution of the deceleration control, so as to suppress an extent of deceleration of the host vehicle, in comparison with a second controlled variable, which is the controlled variable when the slip of the host vehicle is not detected without execution of the deceleration control.

In the aforementioned embodiments, the "external information recognition device 11" corresponds to an example of the "recognizer", the "target acceleration arithmetic device 14" corresponds to an example of the "controller", and the "slip determination device 13" corresponds to an example of the "detector". The "target acceleration" according to the aforementioned embodiment corresponds to an example of the "controlled variable associated with the deceleration control".

The "deceleration control" is something that requires the host vehicle to decelerate or stop. Specifically, examples of the deceleration target are: an obstacle, such as, for example, another vehicle, a pedestrian, and a structure; something that restricts travel of the host vehicle, such as, for example, a road sign, a red light, and a stop line; and a road structure, such as, for example, an intersection and a curve.

The detector is configured to detect the slip of the host vehicle. Various existing aspects can be applied to a method of detecting the slip. An example includes a method of comparing a speed of the host vehicle (i.e., a vehicle body speed) with a vehicle wheel speed.

The controller is configured or programmed to perform the deceleration control when the deceleration target is recognized. The controller may not perform the deceleration control only on condition that the deceleration target is recognized. The controller may perform the deceleration control if another condition is satisfied in addition to that deceleration target is recognized.

On the vehicle control apparatus, the controlled variable associated with the deceleration control is the first controlled variable or the second control variable depending on whether or not the slip of the host vehicle is detected without execution of the deceleration control. In other words, on the vehicle control apparatus, the controlled variable associated with the deceleration control is changed depending on whether or not the slip of the host vehicle is detected.

If no measures are taken and the host vehicle slips during execution of the deceleration control, it may be hard to appropriately control the behavior of the host vehicle. Moreover, as a result of the slip of the host vehicle during current execution of the deceleration control, even if the controlled variable is changed in subsequent execution of the deceleration control, the host vehicle may slip again. This is because not the road surface condition but the deceleration control may cause the host vehicle to slip.

On the vehicle control apparatus, however, if the slip of the host vehicle is detected without execution of the deceleration control, the controlled variable associated with the deceleration control is set to suppress the extent of deceleration of the host vehicle, in comparison with those when the slip of the host vehicle is not detected without execution of the deceleration control. In other words, on the vehicle control apparatus, if the slip of the host vehicle is detected before execution of the deceleration control, the controlled variable is changed in advance so as to suppress the extent of the deceleration caused by the deceleration control. The expression "to suppress the extent of the deceleration" may conceptually include not only suppressing a degree of deceleration, but also suppressing, for example, a change amount (particularly, an increase amount) per unit time of the degree of deceleration, or the like.

By virtue of such a configuration, it is possible to prevent the slip caused by execution of the deceleration control. In addition, a special configuration for detecting the slip of the host vehicle is not required, and it is thus possible to reduce costs for realizing the vehicle control apparatus.

In an aspect of the vehicle control apparatus, when setting the first controlled variable, the controller is programmed to set the first controlled variable so as to increase a suppression degree of the extent of the deceleration if a risk of a collision between the host vehicle and the deceleration target is low, in comparison with those when the risk of the collision is high.

If the host vehicle is stopped by the deceleration control and if the risk of the collision between the host vehicle and the deceleration target is relatively high (e.g., if the deceleration target is an obstacle), priority is given to stopping the host vehicle over preventing the slip. On the other hand, if the host vehicle is stopped by the deceleration control and if the risk of the collision between the host vehicle and the deceleration target is relatively low (e.g., if the deceleration target is a stop sign), priority can be given to preventing the slip over stopping the host vehicle. This is because the deviation of the stop position of the host vehicle from a target stop position is allowed regardless of a degree of the deviation.

In this aspect, if the risk of the collision is low, the first controlled variable is set so as to increase the suppression degree of the extent of the deceleration in comparison with those when the risk of the collision is high. As a result, the extent of the deceleration caused by the deceleration control when the risk of the collision is low, is lower than those when the risk of the collision is high. In other words, if the risk of the collision is high, the first controlled variable is set to reduce the suppression degree of the extent of the deceleration in comparison with those when the risk of the collision is low. As a result, the extent of the deceleration caused by the deceleration control when the risk of the collision is high, is higher than those when the risk of the collision is low.

Therefore, according to this aspect, it is possible to appropriately prevent the collision between the host vehicle and the deceleration target when the risk of the collision is high, and it is possible to prevent the slip from occurring when the risk of the collision is low.

In another aspect of the vehicle control apparatus, when setting the first controlled variable, the controller is programmed to set the first controlled variable so as to increase a suppression degree of the extent of the deceleration if a following vehicle, which is another vehicle that follows the host vehicle, is recognized by the recognizer, in comparison with those when the following vehicle is not recognized.

If there is a possibility that the host vehicle slips (i.e., if the slip of the host vehicle is detected without execution of the deceleration control), a following vehicle possibly slips. In this case, if the deceleration control causes relatively large deceleration to be generated in the vehicle 1 and if the distance between the host vehicle and the following vehicle is reduced relatively quickly, then, there is a risk that the following vehicle collides with the host vehicle if the following vehicle slips.

Therefore, as described above, by setting the first controlled variable so as to increase the suppression degree of the extent of the deceleration if the following vehicle is recognized, in comparison with those when the following vehicle is not recognized (as a result of which the extent of the deceleration caused by the deceleration control when the following vehicle is recognized is less than those when the following vehicle is not recognized), it is possible to prevent the following vehicle from colliding with the host vehicle.

In another aspect of the vehicle control apparatus, when setting the first controlled variable, the controller is programmed to set the first controlled variable so as to increase a suppression degree of the extent of the deceleration if an arrival time is short, in comparison with those when the arrival time is long, wherein the arrival time is a time until the host vehicle arrives at a traffic light, which is the deceleration target, and the arrival time is obtained on the basis of a distance between the host vehicle and the traffic light when a color of the traffic light turns red.

If the arrival time is relatively short when the color of the traffic light, which is the deceleration target, turns red, it is necessary to relatively reduce a stop distance of the host vehicle, as a result of which the deceleration generated in the host vehicle becomes relatively large. When there is a possibility that the host vehicle slips, i.e., when the slip of the host vehicle is detected without execution of the deceleration control), if the deceleration control causes relatively large deceleration to be generated in the host vehicle so as to stop the host vehicle at a target stop position (e.g., a position of a stop line corresponding to a traffic light), then, there is a high possibility of the slip of the host vehicle.

Thus, as described above, by setting the first controlled variable se as to increase the suppression degree of the extent of the deceleration if the arrival time is short when the color of the traffic light turns red, in comparison with those when the arrival time is long (as a result or which the extent of the deceleration caused by the deceleration control when the arrival time is short is less than those when the arrival time is long), it is possible to prevent the slip from occurring. In other words, in this aspect, priority is given to preventing the slip.

The present disclosure may be embodied in other specific forms without departing from the spirit or characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A vehicle control apparatus comprising:
an external information recognition device having a sensor configured to detect an external situation of a host vehicle, the external information recognition device configured to recognize a surrounding situation of the host vehicle based on an output of the sensor;
a controller programmed to perform a deceleration control of assisting the host vehicle in decelerating, when a deceleration target is recognized by said external information recognition device, wherein the deceleration target is ahead of the host vehicle on a course thereof and requires the host vehicle to decelerate or stop; and a slip determination device having a vehicle speed sensor and a wheel speed sensor, the slip determination device configured to detect a slip of the host vehicle based on a comparison between a body speed of the host vehicle and a wheel speed of the host vehicle, wherein said controller is programmed to set a first controlled variable, so as not to exceed a value obtained by multiplying jerk by a gain of 1 or less, and so as to suppress an extent of deceleration of the host vehicle due to the deceleration control based on the first controlled variable in comparison with an extent of deceleration of the host vehicle due to the deceleration control based on a second controlled variable, wherein the first controlled variable is a controlled variable associated with the deceleration control when the slip of the host vehicle is detected in a period in which the deceleration control is not performed, wherein the second controlled variable is a controlled variable associated with the deceleration control when the slip of the host vehicle is not detected in the period in which the deceleration.

2. The vehicle control apparatus according to claim 1, wherein when setting the first controlled variable, said controller is programmed to set the gain so as to increase a suppression degree of the extent of the deceleration when a risk of a collision between the host vehicle and the deceleration target is low, in comparison with the first controlled variable when the risk of the collision is high.

3. The vehicle control apparatus according to claim 1, wherein when setting the first controlled variable, said controller is programmed to set the gain so as to increase a suppression degree of the extent of the deceleration when a following vehicle, which is another vehicle that follows the host vehicle, is recognized by said external information recognition device, in comparison with the first controlled variable when the following vehicle is not recognized.

4. The vehicle control apparatus according to claim 1, wherein when setting the first controlled variable, said controller is programmed to set the gain so as to increase a suppression degree of the extent of the deceleration when an arrival time is short, in comparison with the first controlled variable when the arrival time is long, wherein the arrival time is a time until the host vehicle arrives at a traffic light, which is the deceleration target, and the arrival time is obtained on the basis of a distance between the host vehicle and the traffic light when a color of the traffic light turns red.

5. The vehicle control apparatus according to claim 2, wherein when setting the first controlled variable, said controller is programmed to set the first gain so as to increase a suppression degree of the extent of the deceleration when a following vehicle, which is another vehicle that follows the host vehicle, is recognized by said external information recognition device, in comparison with the first controlled variable when the following vehicle is not recognized.

6. The vehicle control apparatus according to claim 2, wherein when setting the first controlled variable, said controller is programmed to set the gain so as to increase a suppression degree of the extent of the deceleration when an arrival time is short, in comparison with the first controlled variable when the arrival time is long, wherein the arrival time is a time until the host vehicle arrives at a traffic light, which is the deceleration target, and the arrival time is obtained on the basis of a distance between the host vehicle and the traffic light when a color of the traffic light turns red.

7. The vehicle control apparatus according to claim 3, wherein when setting the first controlled variable, said controller is programmed to set the gain so as to increase a suppression degree of the extent of the deceleration when an arrival time is short, in comparison with the first controlled variable when the arrival time is long, wherein the arrival time is a time until the host vehicle arrives at a traffic light, which is the deceleration target, and the arrival time is obtained on the basis of a distance between the host vehicle and the traffic light when a color of the traffic light turns red.

8. The vehicle control apparatus according to claim 5, wherein when setting the first controlled variable, said controller is programmed to set the gain so as to increase a suppression degree of the extent of the deceleration when an arrival time is short, in comparison with the first controlled variable when the arrival time is long, wherein the arrival time is a time until the host vehicle arrives at a traffic light, which is the deceleration target, and the arrival time is obtained on the basis of a distance between the host vehicle and the traffic light when a color of the traffic light turns red.

* * * * *